United States Patent
Jin et al.

(10) Patent No.: US 10,974,346 B2
(45) Date of Patent: Apr. 13, 2021

(54) LASER CUTTING METHOD AND MACHINE, AND AUTOMATIC PROGRAMING APPARATUS

(71) Applicant: AMADA HOLDINGS CO., LTD., Kanagawa (JP)

(72) Inventors: Yingjun Jin, Kanagawa (JP); Hitoshi Omata, Kanagawa (JP); Hiroaki Ishiguro, Kanagawa (JP); Takuya Okamoto, Kanagawa (JP); Hideo Hara, Kanagawa (JP); Masato Kunihiro, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/490,180

(22) PCT Filed: Mar. 19, 2018

(86) PCT No.: PCT/JP2018/010861
§ 371 (c)(1),
(2) Date: Aug. 30, 2019

(87) PCT Pub. No.: WO2018/174020
PCT Pub. Date: Sep. 27, 2018

(65) Prior Publication Data
US 2020/0001401 A1 Jan. 2, 2020

(30) Foreign Application Priority Data
Mar. 22, 2017 (JP) .............................. JP2017-055555

(51) Int. Cl.
*B23K 26/38* (2014.01)
*B23K 26/08* (2014.01)
*G05B 19/4097* (2006.01)

(52) U.S. Cl.
CPC .............. *B23K 26/38* (2013.01); *B23K 26/08* (2013.01); *G05B 19/4097* (2013.01)

(58) Field of Classification Search
CPC .. B23K 26/08; B23K 26/38; G05B 19/40932; G05B 19/4097; G05B 2219/36199
See application file for complete search history.

(56) References Cited

U.S. PATENT DOCUMENTS

| 4,746,782 A * | 5/1988 | Weber | ...................... B23H 7/02 |
| | | | 219/69.12 |
| 5,242,555 A * | 9/1993 | Buhler | ...................... B23H 7/06 |
| | | | 204/297.06 |

(Continued)

FOREIGN PATENT DOCUMENTS

| JP | 04-39706 | 2/1992 |
| JP | 05-245671 | 9/1993 |

(Continued)

OTHER PUBLICATIONS

JPH05245671A machine translation, Published in 1992.*

(Continued)

*Primary Examiner* — Geoffrey S Evans
(74) *Attorney, Agent, or Firm* — Greenblum & Bernstein, P.L.C.

(57) ABSTRACT

According to a laser cutting method, a processed part is laser-cut so that the processed part doesn't drop off from a sheet-shaped workpiece. In the laser cutting method, a cut slit of a pressing protrusion, which is curved due to a laser cutting process along an outline of the processed part and then presses a peripheral surface of the processed part, is preliminarily formed around the processed part to be cut out from the workpiece. Then, the laser cutting process is carried out along the outline of the processed part. The pressing protrusion curves toward the processed part due to the laser (Continued)

cutting process of the processed part, and then the processed part is retained by the pressing protrusion.

15 Claims, 13 Drawing Sheets

(56) References Cited

U.S. PATENT DOCUMENTS

| | | | | |
|---|---|---|---|---|
| 5,556,554 A * | 9/1996 | Morishita | ............... | B23H 7/02 |
| | | | | 219/69.12 |
| 6,065,323 A | 5/2000 | Arduino et al. | | |
| 8,776,651 B2 * | 7/2014 | Marti | ...................... | B26D 7/00 |
| | | | | 83/13 |
| 9,511,433 B2 * | 12/2016 | Inukai | ..................... | B23H 1/02 |
| 10,016,832 B2 * | 7/2018 | Abe | ....................... | B23H 7/065 |
| 10,376,977 B2 * | 8/2019 | Shirai | ...................... | B23H 7/20 |
| 10,464,152 B2 * | 11/2019 | Hasegawa | ............. | B23H 11/00 |

FOREIGN PATENT DOCUMENTS

| | | | |
|---|---|---|---|
| JP | 06-238475 | | 8/1994 |
| JP | 07103807 A | * | 4/1995 |
| JP | 11-156439 | | 6/1999 |
| JP | 2013-116493 | | 6/2013 |
| JP | 2013-128972 | | 7/2013 |

OTHER PUBLICATIONS

JPH4747093A machine translation, Published in 1993.*
Japanese to English machine translation of JP-2013116493, Published in 2013.*
Machine translation of Japan Patent No. 07103807, dated Dec. 2020.*
Official Communication issued in International Bureau of WIPO Patent Application No. PCT/JP2018/010861, dated Sep. 27, 2018.
Office Action issued in Japan Counterpart Patent Appl. No. 2019-506200, dated Mar. 28, 2019 along with an English language translation thereof.

* cited by examiner

LASER CUTTING METHOD AND MACHINE, AND AUTOMATIC PROGRAMING APPARATUS

TECHNICAL FIELD

The present invention relates to a laser cutting method and machine, and to an automatic programing apparatus.

BACKGROUND ART

While cutting out a processed part from a sheet-shaped workpiece by a laser processing, the processed part may be stuck on plural pin-supports on which the workpiece is laid or be placed on the workpiece and thereby may inhibit motions of a laser processing head, or the processed part may be stuck under the workpiece. In order to prevent these events, a processed part is jointed with a workpiece by a minute jointing portion(s) called as a micro-joint(s) and thereby the processed part is not entirely separated from the workpiece. A minute protrusion may be formed on the processed part due to the micro-joint in this case when the processed part is separated from the workpiece, and thereby a process for removing the minute protrusion is needed. Therefore, joining of a processed part with a workpiece without using a micro-joint is proposed (see Patent Documents 1 and 2 listed below).

Note that, in general, a "micro-joint" is a jointing work for making a processed part retained by a workpiece in order to prevent the processed part from dropping off from the workpiece during a laser processing, and is also called as a "wire-joint". According to the "micro-joint", the processed part is made retained by the workpiece by forming a jointing portion having a width from several micrometers and several hundreds micrometers while cutting an outline of the processed part.

PRIOR ART DOCUMENT

Patent Document

Patent Document 1: Japanese Patent Application Publication No. H5-245671
Patent Document 2: Japanese Patent Application Publication No. H6-238475

SUMMARY OF INVENTION

The Patent Document 1 discloses a laser processing method for restricting a cut piece (processed part) from being separated from a workpiece by supplying adhesives on a cut line(s) (slit(s)) of laser processing while cutting out the cut piece from the sheet-shaped workpiece by a laser processing. Therefore, removal of the adhesives is needed when separating the cut piece from the workpiece.

The Patent Document 2 discloses a laser processing method for restricting a cut piece from being separated from a workpiece by utilizing melted residues of the workpiece generated through a laser processing while cutting out a product from the workpiece. Depending on a laser processing condition, it may occur that the product is melted by the melted residues and thereby the melted residues adhere firmly on the product. In this case, removal of the melted residues is needed.

In addition, a focused beam diameter of fiber laser having a 1 μm-band wavelength is smaller than that of carbon dioxide laser having a 10 μm-band wavelength, and thereby a cutting slit by the fiber laser is narrow. Since a cutting slit gets wide when cutting by the carbon dioxide laser, a cut piece drops off through plural pin supports without being stuck with them. However, the cut piece will be more likely to be stuck with the workpiece due to the narrow cutting slit made through cutting by the fiber laser, and thereby there is concern that motions of a laser processing head is prohibited.

A first aspect of the present invention provides a laser cutting method for cutting out a processed part from a sheet-shaped workpiece, the method comprising: (a) preliminarily laser-cutting a cut slit of a pressing protrusion around the processed part to be cut out from the workpiece, the pressing protrusion being curved due to a laser cutting process along an outline of the processed part and then pressing a peripheral surface of the processed part; and (b) carrying out the laser cutting process along the outline of the processed part.

A second aspect of the present invention provides a laser cutting machine for cutting out a processed part from a sheet-shaped workpiece, the machine comprising: a laser processing head movable relative to the workpiece W in X, Y and Z-axis directions; and a control device for controlling motions of the laser processing head, wherein the control device comprises: a processing program memory that stores a processing program for laser-cutting the processed part; a program analyzer that analyzes a shape and dimensions of the processed part by analyzing the processing program; a weight arithmetic section that calculates a weight of the processed part based on the analyzed shape and the analyzed dimensions of the processed part and a thickness of the workpiece; a number arithmetic section that calculates the number of pressing protrusions based on a calculation result of the weight arithmetic section, each of the pressing protrusions being curved due to a laser cutting process along an outline of the processed part and then pressing a peripheral surface of the processed part; a pressing protrusion arranger that arranges the pressing protrusions around the processed part based on a calculation result of the number arithmetic section; a processing program generator that generates a laser cutting program for forming the pressing protrusions at positions arranged by the pressing protrusion arranger; the processing program memory that stores the laser cutting program generated by the processing program generator; and an axial motion controller that controls axial motions of the laser processing head according to the laser cutting program stored in the processing program memory.

A third aspect of the present invention provides an automatic programming apparatus of a laser cutting machine, the apparatus comprising: a weight arithmetic section that calculates a weight of the processed part based on a shape and dimensions of a processed pat that are input though a CAD and a thickness of a workpiece; a number arithmetic section that calculates the number of pressing protrusions based on a calculation result of the weight arithmetic section, each of the pressing protrusions being curved due to a laser cutting process along an outline of the processed part and then pressing a peripheral surface of the processed part; a pressing protrusion arranger that arranges the pressing protrusions around the processed part based on a calculation result of the number arithmetic section; a processing program generator that generates a laser cutting program for forming the pressing protrusions at positions arranged by the pressing protrusion arranger and laser-cutting the processed part; a processing program memory that stores the laser cutting program generated by the processing program generator; and a program transferrer that transfers the laser cutting program stored in the processing program memory to a control device of the laser cutting machine.

DESCRIPTION OF EMBODIMENTS

Figure 1:
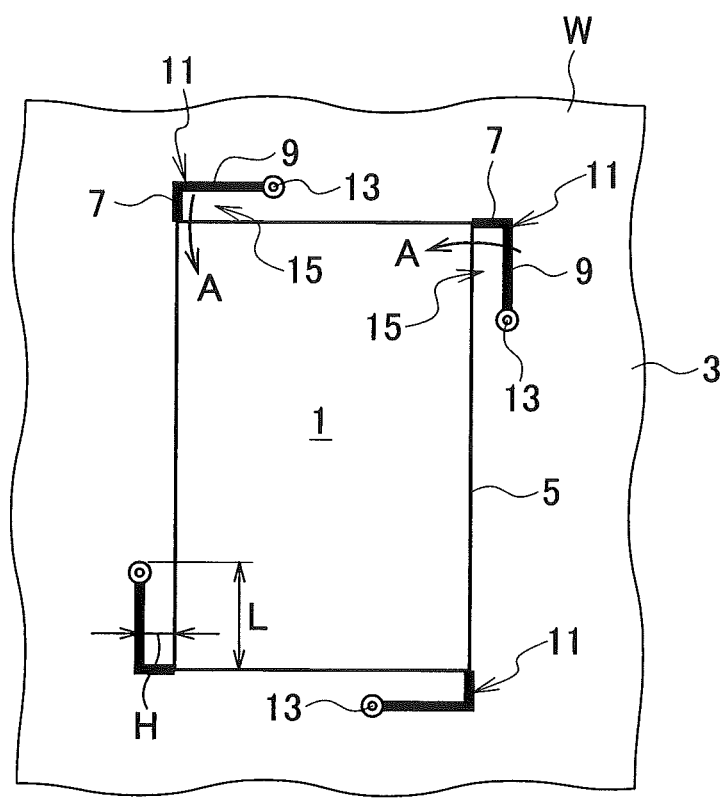
FIG. 1 It is an explanatory diagram (first example) of a method for cutting out a processed part from a workpiece.

As shown in FIG. 1, a rectangular-shaped processed part 1 is to be cut out from a sheet-shaped workpiece W by a laser cutting process. Here, while cutting out the processed part 1 by the laser cutting process, a cut slit 11 having an appropriate length is preliminarily formed by a laser processing at at least one position of a scrap 3 to be discarded after cutting out the processed part 1. Each cut slit (cutting slit) 11 is formed along an outline 5 of the processed part 1 and formed by a long slit 9 and a short slit 7, and a short side opposite to the short slit 7 is remained without being cut. Each cut slit 11 has a slit-shape continuously formed by the long slit 9 and the short slit 7. After the cut slit 11 is formed, the laser cutting process is carried out along the outline 5 of the processed part 1. Note that the short slit 7 has a length not larger than a thickness of the workpiece W.

When forming the cut slit 11, a portion of the cut slit 11 is melted by heats of the laser cutting process. Then, a portion around the cut slit 11 is quickly cooled due to heat conduction after the laser cutting process of the cut slit 11. Further, when the processed part 1 has been cut out from the workpiece W by carrying out the laser cutting process along the outline 5, a pressing protrusion 15 having a rectangular shape longwise in a direction along the outline 5 is formed between the cut slit 11 and the outline 5. A width H of a short side of the pressing protrusion 15 is not larger than the thickness of the workpiece W, and a length L of a long side thereof is three to eight times larger than the thickness.

Relations between dimensions (the width H and the length L [mm]) of the pressing protrusion 15 and its retention force [N] are actually measured by using the workpiece W made of an iron-based material and an aluminum-based material. Note that the retention force is a retention force exerted by a single pressing protrusion 15. A size of the cut-out processed part 1 is a 65 mm square, and one of two pairs of opposite two sides of the square is parallel to a roll-expanding direction of the workpiece (the roll-expanding direction will be explained later). The pressing protrusion 15 is formed for each side one by one, and an end of the pressing protrusion 15 is positioned at the center of said each side. In addition, an extending direction of the pressing protrusion 15 coincides with a cutting direction of the outline 5 (the extending direction and the cutting direction will be explained later).

The iron-based material of the workpiece used for the measurements is SECC (electro galvanized zinc plated steel sheet) and SUS (stainless steel sheet). A thickness of SECC is 2.3 mm, and a thickness of SUS is 2.0 mm (an after-explained base-end hole 13 is a mere pierced hole). The measurement results (the relations between the dimensions of the retention protrusion 15 and its retention force) of SECC are shown by a graph in FIG. 2, and the measurement results of SUS are shown by a graph in FIG. 3. In addition, the aluminum-based material of the workpiece used for the measurements is a sheet member made of aluminum alloy A5052, and its thickness is 2.0 mm (an after-explained base-end hole 13 is a mere pierced hole). The measurement results of the aluminum-based material are shown by a graph in FIG. 4.

Figure 2:
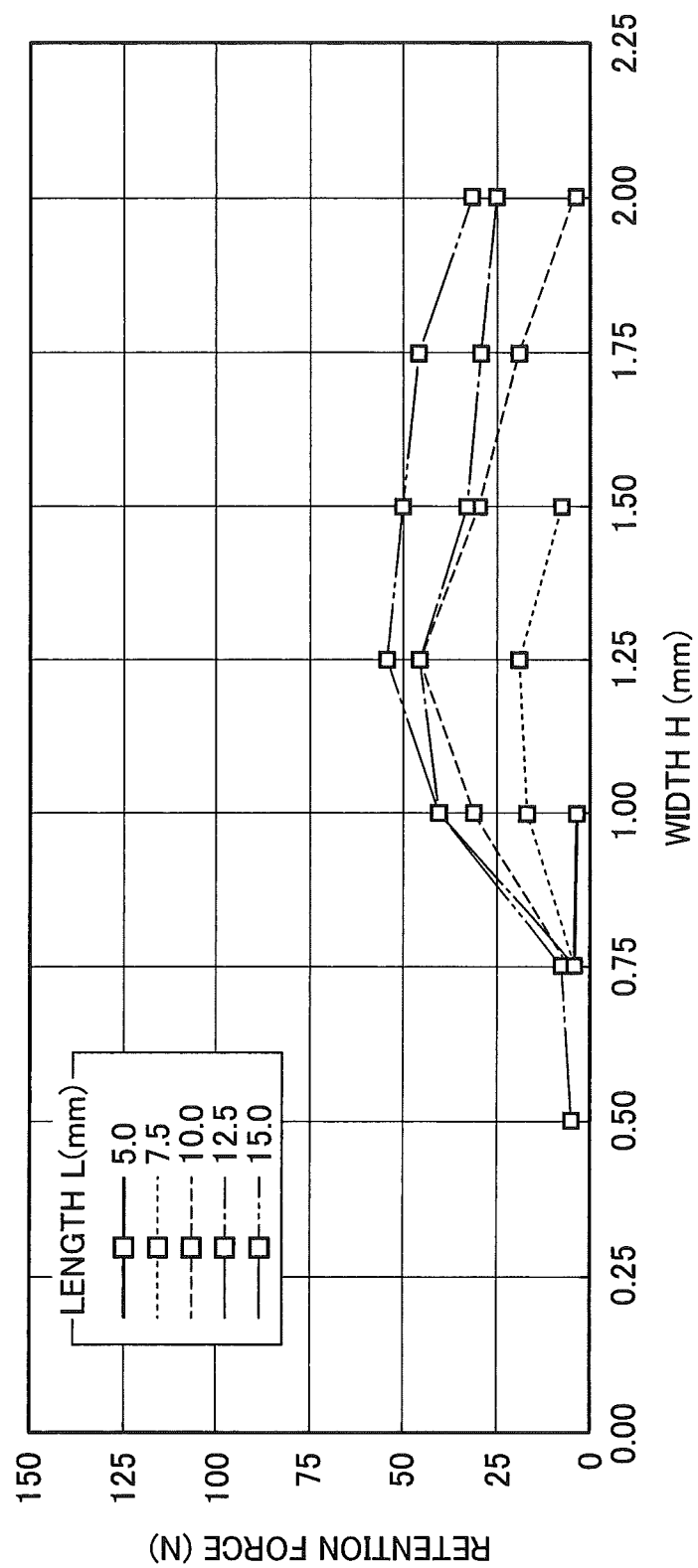
FIG. 2 It is a graph showing relations between dimensions of a retention protrusion and its retention force (iron-based material: SECC).
Figure 3:
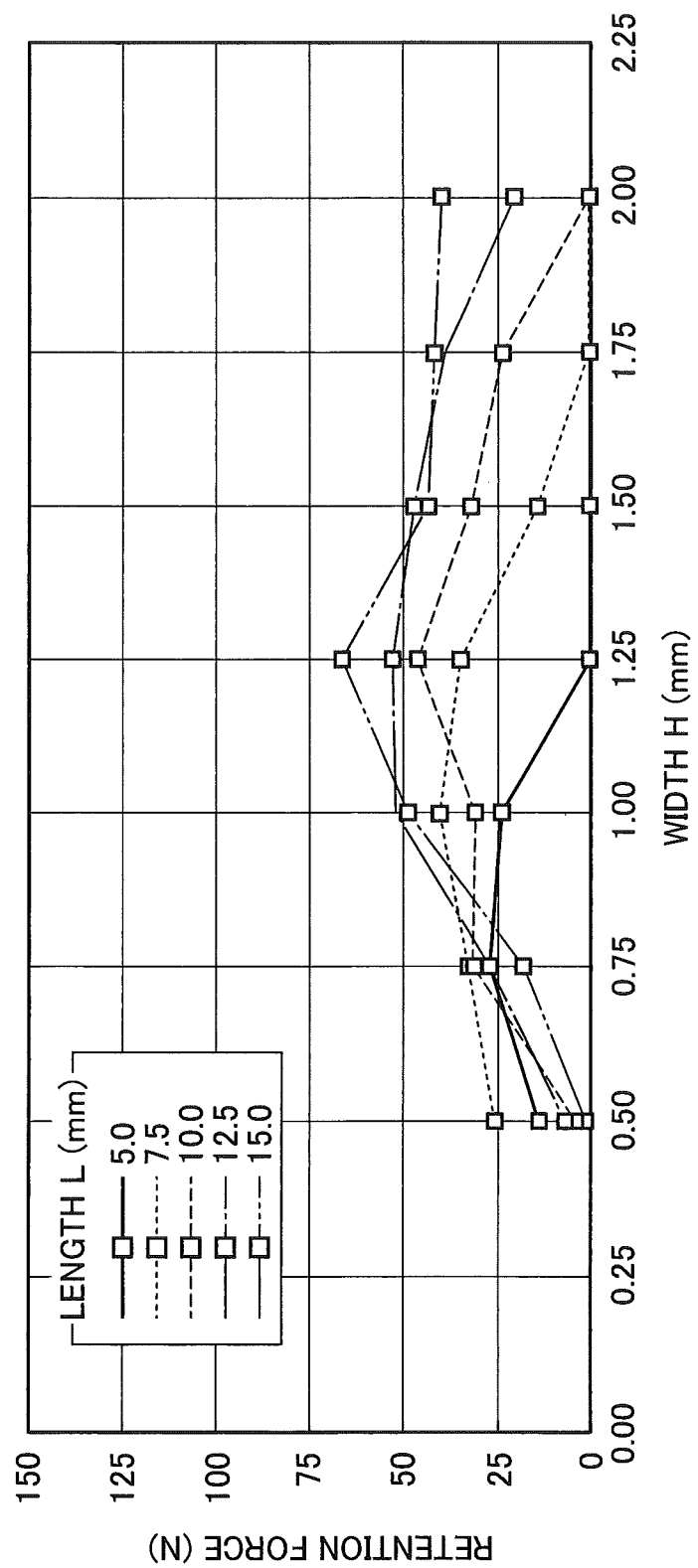
FIG. 3 It is a graph showing relations between dimensions of a retention protrusion and its retention force (iron-based material: SUS).
Figure 4:
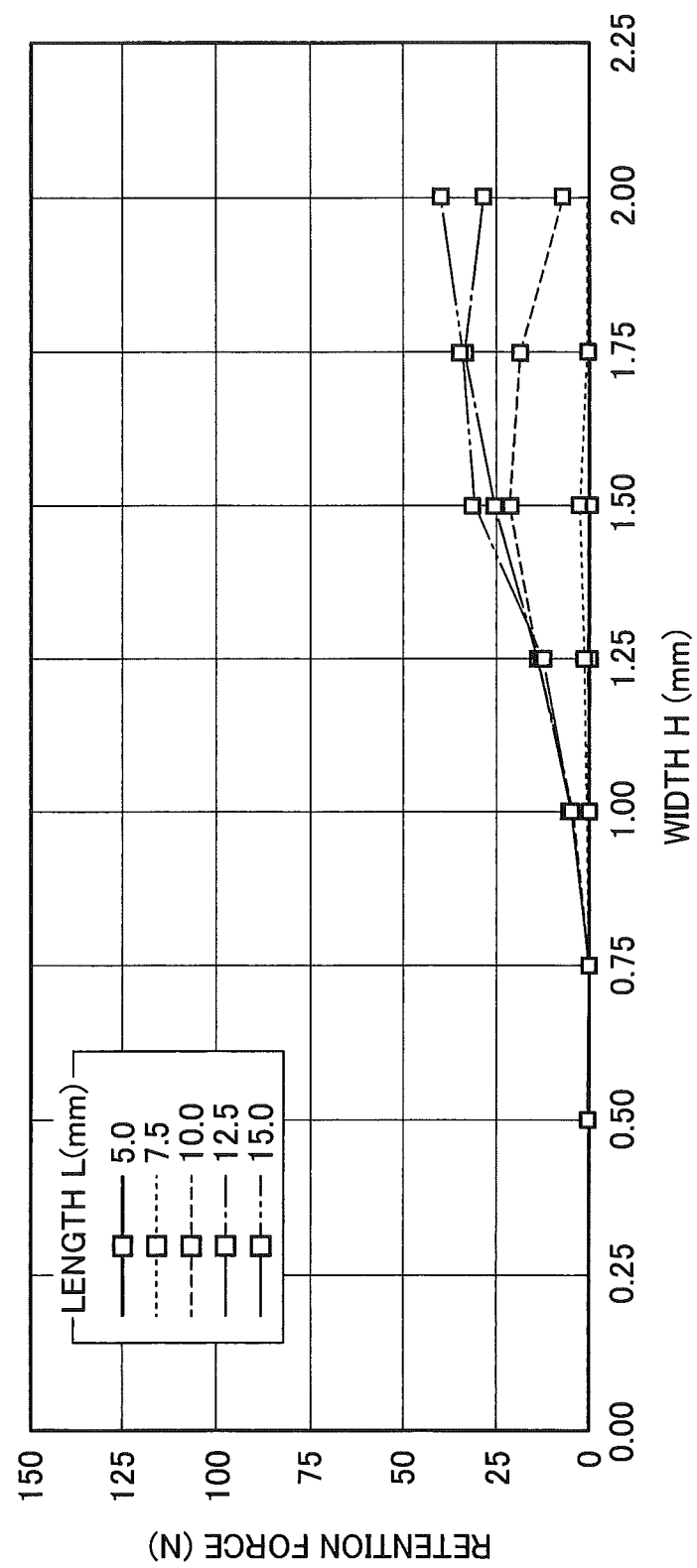
FIG. 4 It is a graph showing relations between dimensions of a retention protrusion and its retention force (aluminum-based material).

As understood from the graphs in FIG. 2 to FIG. 4, the widths H 1.00 mm to 1.75 mm are good, and 1.25 mm is better. In addition, the lengths L 7.5 mm to 15 mm are good, and 15 mm is better. Note that, with respect to the length L, larger one than 15 mm is not measured. In consideration of practical aspects such as the dimensions of the processed part 1 (the product to be cut out) and a plastic deformation amount of the pressing protrusion 15, it is determined that the pressing protrusion 15 longer than 15 mm is not needed.

Figure 10:
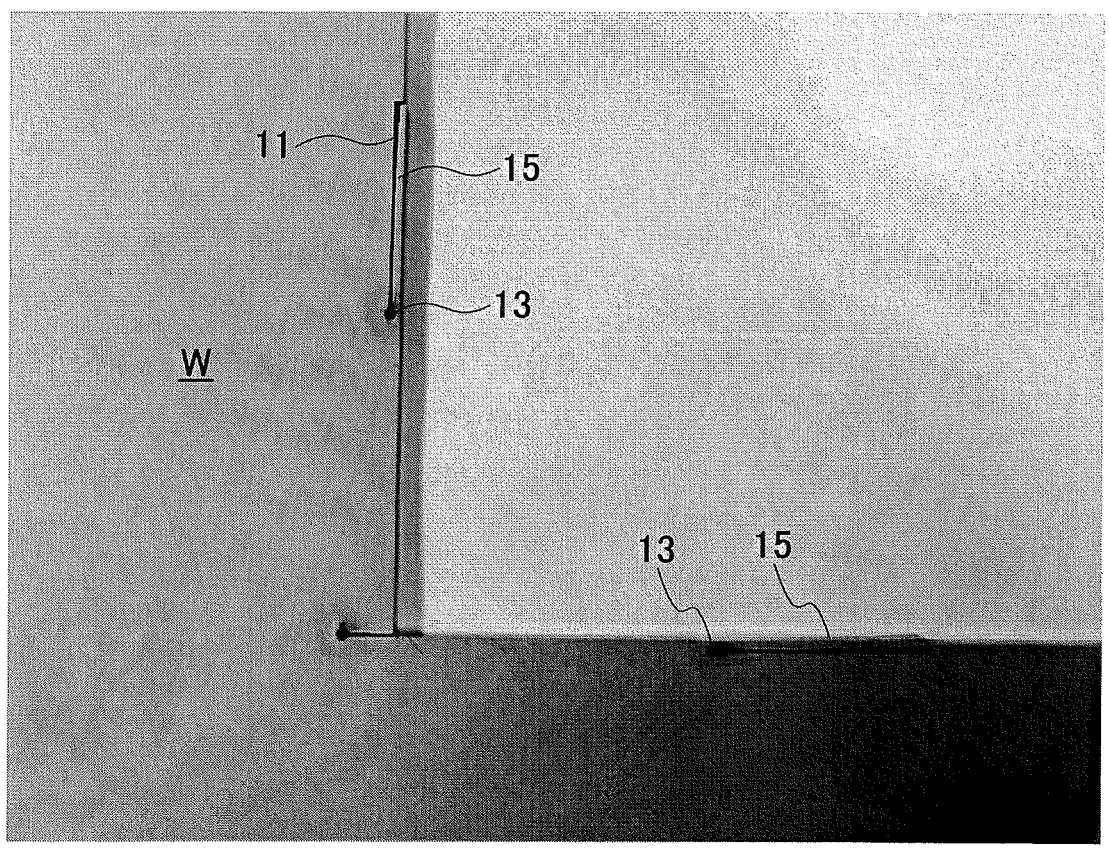
FIG. 10 It is a photograph showing a state where the protrusion curves.

Residual stress exists in the pressing protrusion 15 due to affection by heats of the laser cutting process of the cut slit 11. Then, the residual stress is released when the outline 5 of the processed part 1 has been laser-cut after the laser cutting process of the cut slit 11. As the result, a free end of the pressing protrusion 15 curves toward the processed part 1 (in a direction indicated by an arrow A) due to the residual stress (see FIG. 10), and thereby the free end presses a peripheral surface (cut face) of the processed part 1. Therefore, by carrying out the laser cutting process along the outline 5 of the processed part 1 after preliminarily forming at least one cut slit 11 around the processed part 1, the processed part 1 can be retained by the curvature of the pressing protrusion 15 due to the residual stress so as not to drop off from the workpiece W.

Figure 5:
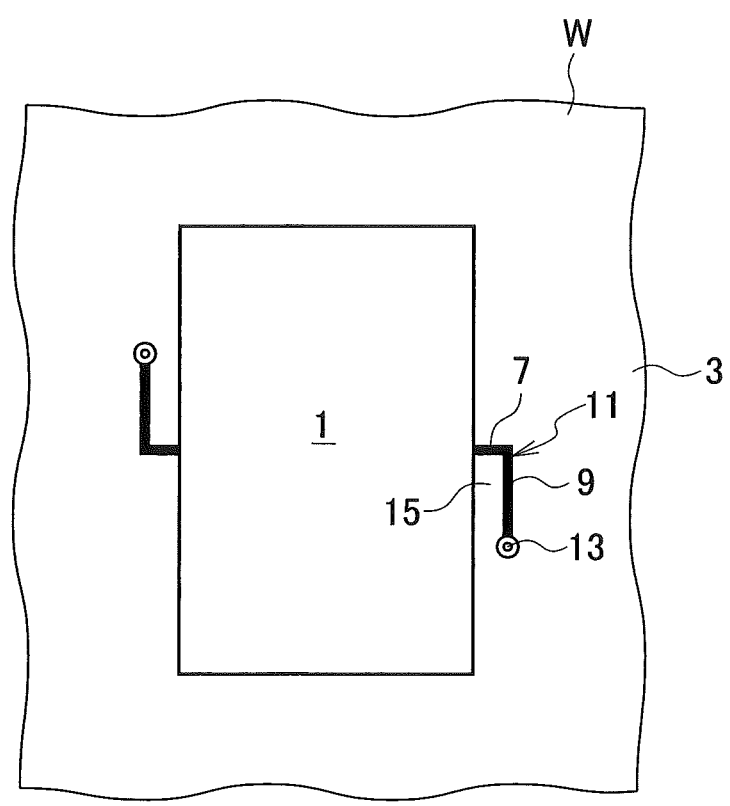
FIG. 5 It is an explanatory diagram (second example) of a method for cutting out a processed part from a workpiece.

Note that, in the first example shown in FIG. 1, the pressing protrusion 15 is formed at each of four corners of the processed part 1. Namely, the four pressing protrusions 15 are formed in the first example. In the second example shown in FIG. 5, a pair of the pressing protrusions 15 is arranged oppositely to each other with the processed part 1 interposed therebetween. Then, the pressing forces of the two pressing protrusions 15 are applied toward the processed part 1, and opposed to each other. Therefore, the processed part 1 is clamped by the pressing forces of the two pressing protrusions 15, and the processed part 1 can be retained efficiently by the less pressing protrusions 15. Note that the pressing protrusions 15 are formed longwise in the roll-expanding direction of the workpiece W. Advantages brought by forming the pressing protrusions 15 longwise in the roll-expanding direction of the workpiece W will be explained later.

For the laser cutting process of the cut slit 11, a base-end hole 13 is laser-processed at a start end of the long slit 9 (a base end of the pressing protrusion 15) at first. The base-end hole 13 is a through hole. In addition, a radius of the base-end hole 13 is made larger than a radius of a pierced hole merely penetrated by piercing. Namely, the retention force can be improved by making a curvature support point (a portion from a closest position to the outline 5 on an inner circumferential edge of the base-end hole 13 to a cutting slit of the outline 5) of the pressing protrusion 15 close to the processed part 1 to enhance the inward curvature of the pressing protrusion 15. Note that the radius of the base-end hole 13 is determined so that the curvature support point of the pressing protrusion 15 doesn't get broken (ensures sufficient stiffness to keep the retention force) with its width got by subtracting the cutting slit width of the outline 5 and the radius of the base-end hole 13 from the above-mentioned width H. For example, in a case where a thickness of a workpiece is 2.0 mm or so, a radius of the base-end hole 13 may be 0.75 mm and the width H may be 1.25 mm.

After forming the base-end hole 13, the long slit 9 and the short slit 7 are sequentially formed without deactivating a laser light and stopping the motions of the processing head. Just after forming the base-end hole 13, a portion around the base-end hole 13 is quickly cooled due to heat conduction outward from the position of the base-end hole 13 that is an initial position of the leaser processing. Therefore, the residual stress on a side of the free end of the pressing protrusion 15 becomes larger than the residual stress on a side of the base end thereof (near the base-end hole 13). Then, in a case of where the cutting direction of the outline 5 of the processed part 1 is made coincident with the extending direction of the pressing protrusion 15 to be formed (the cutting direction of the long slit 9), the pressing protrusion 15 can be effectively curved in the direction indicated by the arrow A with the above-mentioned curvature support point serving as a base end. Note that, if the cutting direction of the outline 5 and the extending direction of the pressing protrusion 15 are opposite to each other, the pressing protrusion 15 can be curved in the direction indicated by the arrow A but its retention force becomes slightly smaller.

The relations between the diameter (radius×2) of the base-end hole 13 and the retention force [N] are actually measured by using the workpieces made of the iron-based material and the aluminum-based material. Note that the retention force is a retention force exerted by a single pressing protrusion 15. A size of the cut-out processed part 1 is a square whose each side is 65 mm, and one of two pairs of opposite two sides of the square is parallel to the roll-expanding direction of the workpiece. The pressing protrusion 15 is formed for each side one by one, and the end of the pressing protrusion 15 is positioned at the center of said each side. In addition, the extending direction of the pressing protrusion 15 coincides with the cutting direction of the outline 5.

Figure 6:
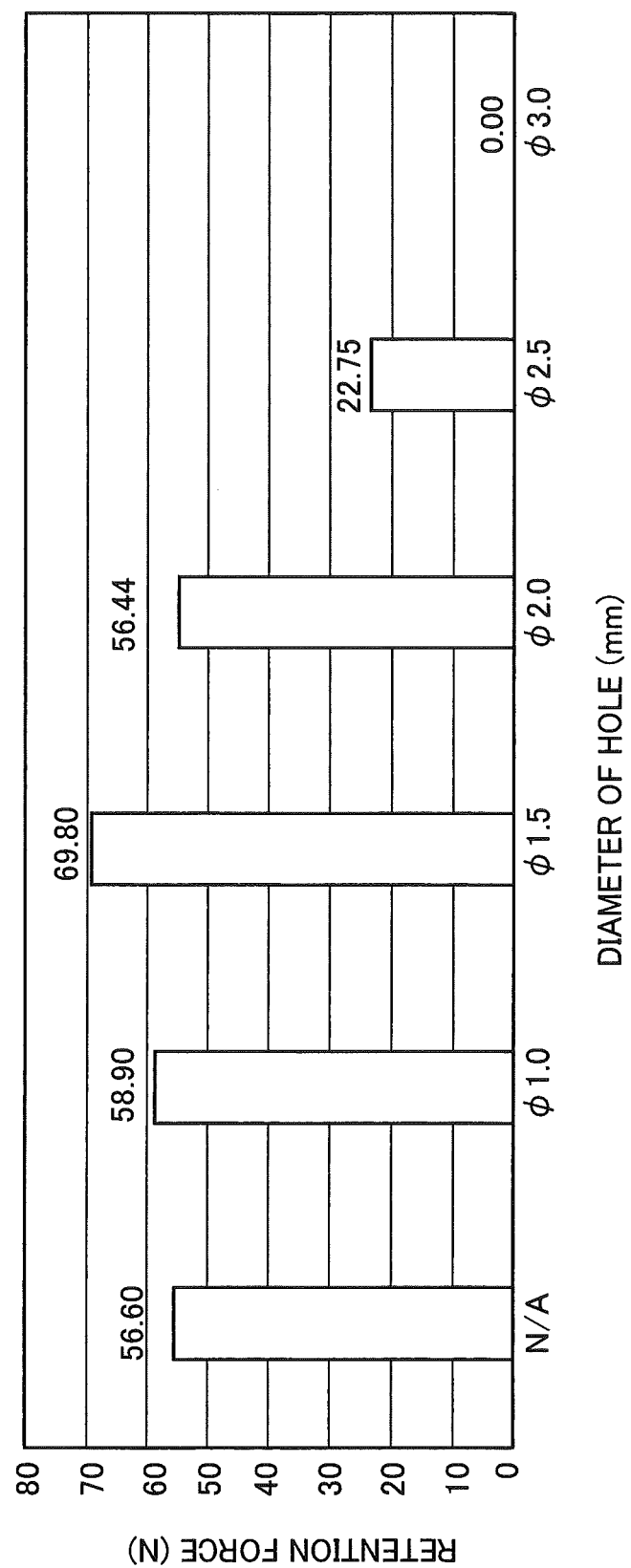
FIG. 6 It is a graph showing relations between dimensions of a retention protrusion and its retention force (iron-based material: SECC).
Figure 7:
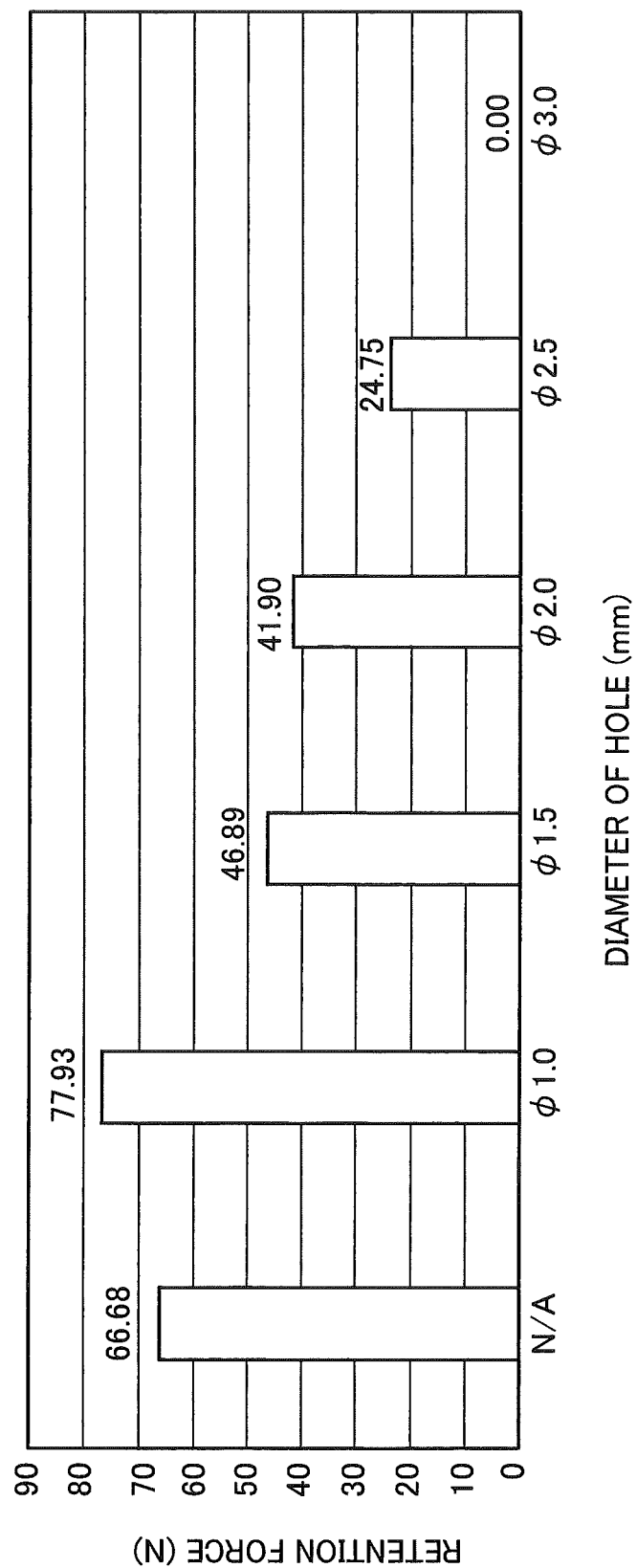
FIG. 7 It is a graph showing relations between dimensions of a retention protrusion and its retention force (iron-based material: SUS).
Figure 8:
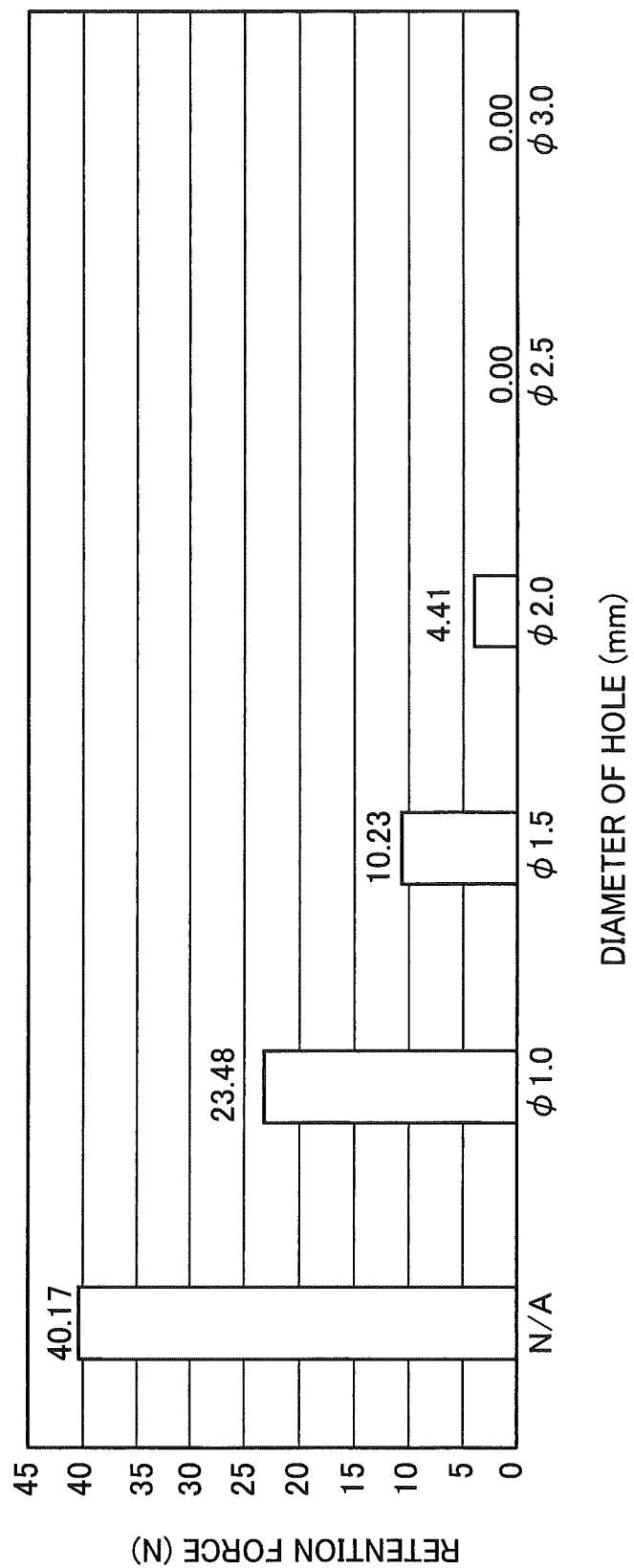
FIG. 8 It is a graph showing relations between dimensions of a retention protrusion and its retention force (aluminum-based material).

The iron-based material of the workpiece used for the measurements is SECC (electro galvanized zinc plated steel sheet) and SUS (stainless steel sheet). A thickness of SECC is 2.3 mm, and a thickness of SUS is 2.0 mm. The measurement results (relations between dimensions of the retention protrusion 15 and its retention force) of SECC are shown by a graph in FIG. 6, and the measurement results of SUS are shown by a graph in FIG. 7. In addition, the aluminum-based material of the workpiece used for the measurements is a sheet member made of aluminum alloy A5052, and its thickness is 2.0 mm. The measurement results of the aluminum-based material are shown by a graph in FIG. 8. In cases where the hole diameter of the base-end hole 13 is "N/A" in the graphs, the base-end hole 13 is a mere pierced hole and its hole diameter is not enlarged intentionally (the diameter of the pierced hole is 0.5 mm).

As understood from the graphs, with respect to the ion-based material, a larger retention force can be obtained when forming the base-end hole 13 having a diameter larger than that of a mere pierced hole. However, when the base-end hole 13 is too large, the stiffness of the above-mentioned curvature support point becomes insufficient and thereby the retention force reduces. With respect to SECC, the retention force increases by about 20% when the diameter of the base-end hole 13 is set to 1.5 mm. With respect to SUS, the retention force increases by about 15% when the diameter of the base-end hole 13 is set to 1.0 mm. However, with respect to the aluminum-based material, cases where the base-end hole 13 having a diameter larger than that of a mere pierced hole is not formed are better.

Note that it is sufficient that the width H and the length L of the pressing protrusion 15 are a width and a length by which the pressing protrusion 15 curves during the laser cutting process of the outline 5 of the processed part 1 and thereby presses the processed part 1 to retain the processed part 1 by a friction resistant force due to the pressing force. Therefore, the width H and the length L of the pressing protrusion 15 may be set to a width and a length that are desired according to a size of the processed part 1, the number of the cut slits 11 to be formed around the processed part 1 and so on.

Note that the residual stress generated in the pressing protrusion 15 during the formation of the cut slit 11 is reduced in some degree when the pressing protrusion 15 is heated during the laser cutting process of the outline 5. In addition, the residual stress of the pressing protrusion 15 reduces in some degree as time goes on. However, necessary residual stress never gets dissipated while cutting the processed part 1 and while separating the processed part 1 from the workpiece W, and thereby the retention for the processed part 1 is unaffected.

Further, the pressing protrusion 15 curves more remarkably in the direction indicated by the arrow A when being formed longwise in the roll-expanding direction of the workpiece W than when being formed longwise in a direction perpendicular to the roll-expanding direction. Therefore, it is desired that the number of the pressing protrusions 15 longwise in the roll-expanding direction is increased in order to retain the processed part 1 separably. However, the residual stress due to (heats of) the laser cutting process is more predominant than the residual stress due to the roll-expansion, so that there may be a case where the residual stress due to the roll-expansion can be ignored when the thickness of the workpiece W increases.

According to the present embodiment, the cut slit 11 (e.g. having an L-shaped in the present embodiment) is preliminarily formed along the outline 5 of the processed part 1 by carrying out the laser cutting process in a desired area around the pressing protrusion 15 while cutting out the processed part 1 from the workpiece W. The pressing protrusion 15 presses the peripheral surface of the processed part 1 due to the residual stress while laser-cutting the outline 5 of the processed part 1 and thereby retains it so that the processed part 1 is not separated from the workpiece W (not separated from the scrap 3). The pressing protrusion 15 is formed longwise along the outline 5.

Figure 9:
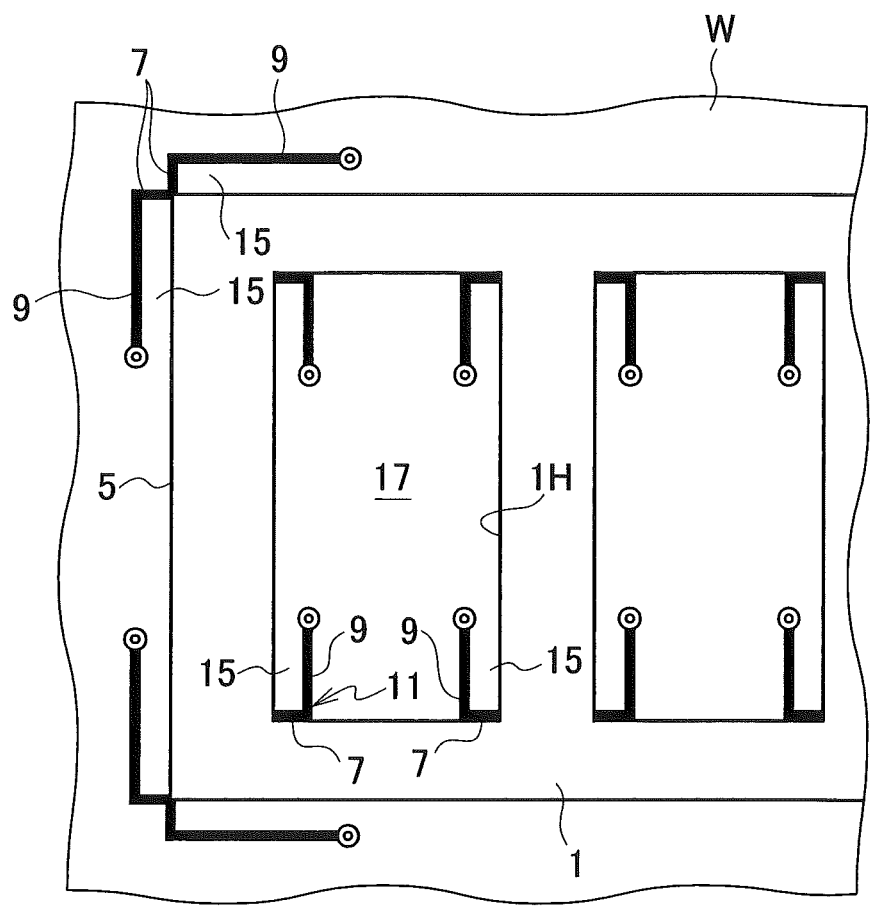
FIG. 9 It is an explanatory diagram (third example) of a method for cutting out a processed part from a workpiece.

In a case of forming a hole 1H inside the processed part 1 (the outline 5) as shown in FIG. 9 (the third example), an inside portion 17 of the hole 1H becomes a scrap at last. In this case, the cut slit(s) 11 is preliminarily formed in the inside portion 17 and a laser cutting process is carried out in a desired area around the pressing protrusion 15 while laser-cutting an outline of the hole 1H. By laser-cutting the outline of the hole 1H in this manner, the pressing protrusion 15 presses an inner peripheral surface of the hole 1H and thereby the inside portion 17 is retained (the inside portion 17 is restricted from being separated from the processed part 1).

In the case of forming the hole 1H inside the processed part 1, it is preferable to laser-cut the outline of the hole 1H (the inside portion 17) in a state where the processed part 1 is being unified with the workpiece W (before carrying out the laser cutting process of the outline 5 of the processed part 1) and then laser-cut the outline 5. Since the length of the outline of the hole 1H is overwhelmingly shorter than the length of the outline 5 of the processed part 1 (in other words, an area of the hole 1H is overwhelmingly smaller than an area within the outline 5 of the processed part 1/a weight of a cut piece inside the hole 1H is overwhelmingly smaller than a total weight of the cut piece inside the hole 1H and the processed part 1), the retention force by the pressing protrusion 15 is more effective for an object having a smaller weight. Note that, if the difference of the weights is small or if there is restriction in carrying out the process, the outline of the hole 1H may be laser-cut after the laser cutting process of the outline 5 of the processed part 1.

Figure 11:
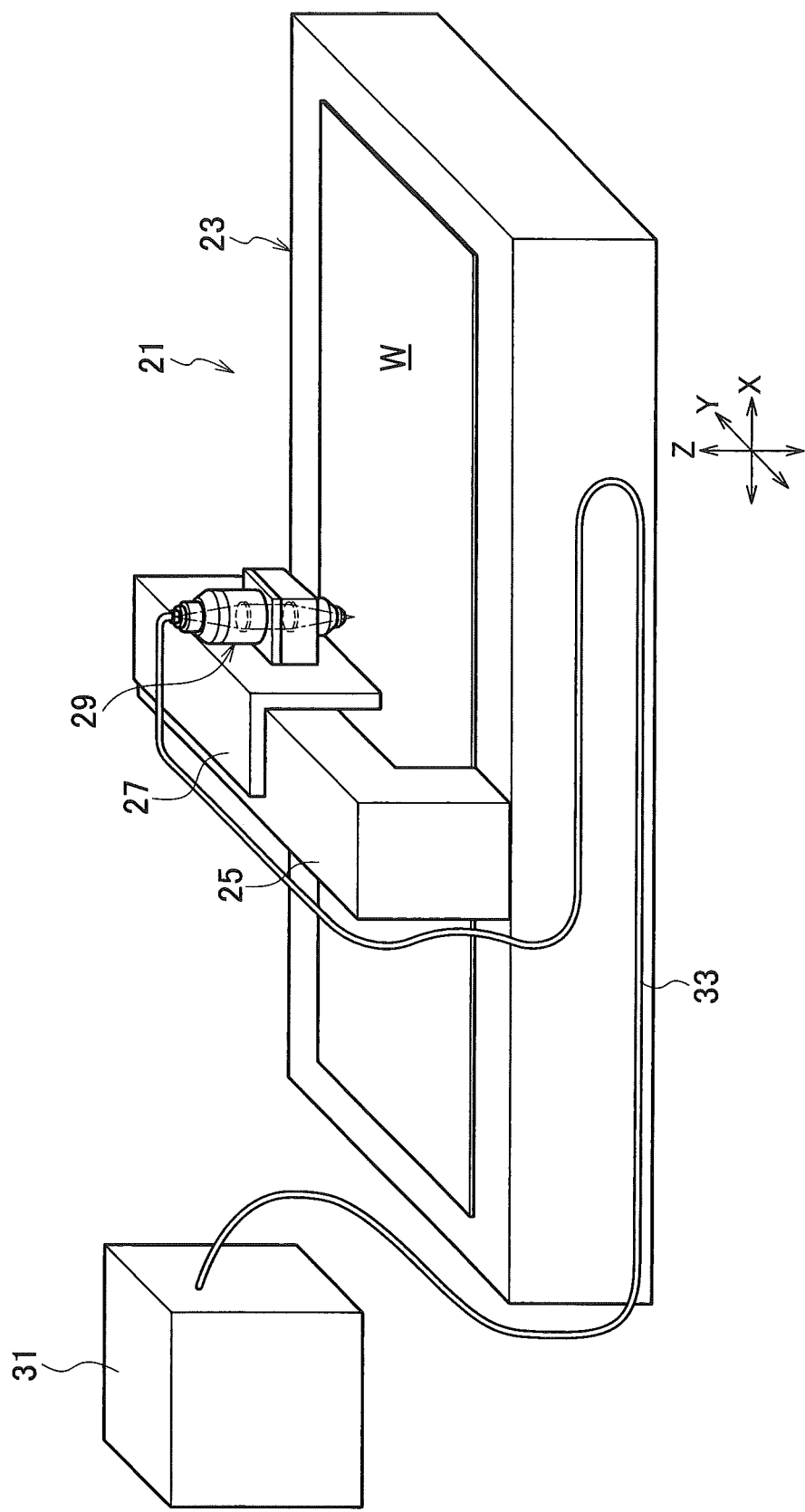
FIG. 11 It is a schematic perspective view of a laser processing machine.

Although general configuration of a laser cutting machine for carrying out a laser cutting process of a workpiece W is commonly known, configuration of a laser cutting machine 21 according to the present embodiment will be explained hereinafter. As schematically shown in FIG. 11, the laser cutting machine 21 includes a support frame (work table) 23 that supports a workpiece W. A gate-shaped movable frame (carriage) 25 is provided on the support frame 23 so as to be movable in an X-axis direction. A slider 27 is provided on the carriage 25 so as to be movable in a Y-axis direction. A laser processing head 29 is provided on the slider 27 so as to be movable vertically (in a Z-axis direction).

The laser processing head 29 is provided so as to be movable relative to the workpiece W in the X, Y and Z-axis directions. Setting of the relative position of the laser processing head 29 in the X, Y and Z-axis directions is controlled by driving an X-axis servo motor, a Y-axis servo motor and a Z-axis servo motor (not shown in the drawings). A fiber laser oscillator 31 is provided as one example of a laser oscillator in order to laser-cut the workpiece W by the laser processing head 29. The fiber laser oscillator 31 and the laser processing head 29 are connected with each other by an optical fiber 33.

Figure 12:
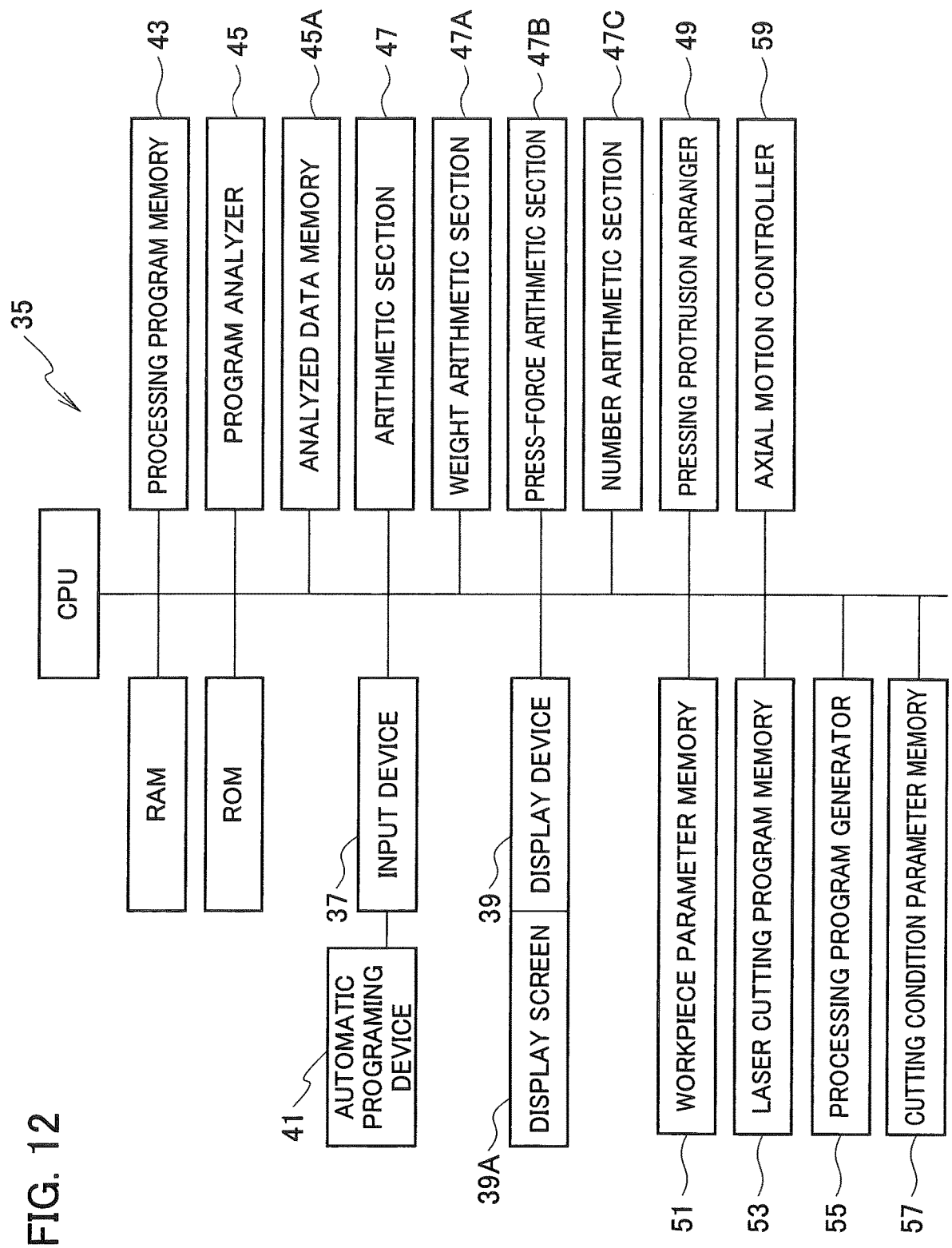
FIG. 12 It is a block diagrams of a control device of the laser processing machine.

The laser cutting machine 21 configured as explained above is controlled by its control device 35 (see FIG. 12). Operations of the laser processing head 29 and operations of the laser oscillator 31 are also controlled by the control device 35, and thereby the processed part 1 is cut out from the workpiece W as explained above.

The control device 35 is configured of a computer, and includes a CPU, a RAM, a ROM, an input device 37 and a display device 39. An automatic programming apparatus 41 that supplies (transmits) a processing program to the control device is connected with the input device 37. Note that the processing program (NC data) generated by the automatic programming apparatus 41 can be supplied to the control device 35 by an appropriate memory media.

The control device 35 includes a processing program memory 43 that stores the processing program. In addition, the control device 35 also includes a program analyzer 45. The program analyzer 45 preliminarily reads out the processing program stored in the processing program memory 43 and then analyzes it, and then calculates an arrangement position on the workpiece W, a shape and dimensions of the processed part 1.

Further, the control device 35 also includes an arithmetic section 47 that executes various arithmetic calculations. In the arithmetic section 47, included is a weight arithmetic section 47A that calculates a weight of the processed part 1 and also calculates a barycentric position and/or a center position of the processed part 1 with referring to a shape and dimensions of the processed part 1 obtained by analyzing the processing program, a material and a thickness of the workpiece W and so on. In addition, in the arithmetic section 47, also included is a press-force arithmetic section 47B that calculates a pressing force of the pressing protrusion(s) 15 to be arranged around the processed part 1.

The press-force arithmetic section 47B refers to the width H and the length L of the pressing protrusion 15 and a laser cutting condition and then calculates the pressing force P=F(H, L, laser cutting condition) [f(a, b, c) is a function with variables a, b and c]. In the laser cutting condition, a laser output power, a processing speed, a focal position, a duty ratio of a pulse output, a pressure of assist gas, a diameter of a head nozzle and so on are included. Therefore, it is hard to determine the laser cutting condition inclusively. Then, in order to determine the laser cutting condition inclusively, the control device 35 also includes a cutting condition parameter memory 57.

Various parameters are stored in the cutting condition parameter memory 57. Namely, residual stresses are preliminarily measured at the laser cutting processes by varying a processing speed, a focal position, a duty ratio of a pulse output, a pressure of assist gas, a diameter of a head nozzle and so on for each set of a material and a thickness of the workpiece W, and these various laser processing conditions are stored in the cutting condition parameter memory 57 as parameters. Therefore, an appropriate parameter(s) can be selected from the cutting condition parameter memory 57 according to the laser cutting condition. The pressing force P is calculated based on the selected parameters.

Further, in the arithmetic section 47, also included is a number arithmetic section 47C that calculates the number of the pressing protrusions 15 to be provided based on the calculation result of the weight arithmetic section 47A and the calculation result of the press-force arithmetic section 47B. If a calculation result includes a digit(s) after the decimal point, the number arithmetic section 47C carries up the calculation result into an integer.

Furthermore, the control device 35 also includes a pressing protrusion arranger 49. The pressing protrusion arranger 49 arranges the pressing protrusions 15 around the processed part 1 based on data analyzed by the program analyzer 45 and then stored in an analyzed data memory 45A, such as the arrangement position, the shape and the dimensions of the processed part 1 and the calculation result of the number arithmetic section 47C.

For example, in a case of providing one pressing protrusion 15, the pressing protrusion arranger 49 arranges the pressing protrusion 15 at a position where a distance from the barycentric position or the center position of the processed part 1 to the outline 5 is made minimum so that the pressing force of the pressing protrusion 15 is directed in a direction toward the barycentric position or the center position. In a case of providing two or more pressing protrusions 15, it arranges the pressing protrusions 15 around the processed part 1 at even intervals along its peripheral direction.

There may be another way in which the processed part 1 is displayed on a display screen 39A of the display device 39 after the calculation of the number of the pressing protrusions 15 by the number arithmetic section 47C, and then the pressing protrusions 15 are arranged around the processed part 1 by operating the input device such as a mouse. In this case, it is possible to increase the number of the pressing protrusions 15 more than the number calculated by the number arithmetic section 47C. In addition, in this case, the display device 39, the mouse and so on function also as the pressing protrusion arranger 49.

The shape and the dimensions of the pressing protrusion 15, i.e. the lengths of the long side and the short side of the rectangular shape are preliminarily determined through experiments as parameters in association with the material and the thickness of the workpiece W and the shape and the dimensions of the processed part 1. In addition, the parameters for determining the shape and the dimensions of the pressing protrusion 15 are stored in a workpiece parameter memory 51. Therefore, an appropriate shape and appropriate dimensions of the pressing protrusion 15 are selected from the workpiece parameter memory 51 according to the material and the thickness of the workpiece W.

When the shape and the dimensions of the pressing protrusion(s) 15 have been selected, a processing program for the laser cutting process of the pressing protrusion 15 is generated according to the shape and the dimensions of the pressing protrusion 15 that have been selected. Namely, the control device 35 includes a laser cutting program memory 53 that preliminarily stores various laser cutting programs for various sets of the shape and the dimensions of the pressing protrusion 15. When the shape and the dimensions of the pressing protrusion(s) 15 have been selected by the parameters, a processing program generator 55 selects an appropriate laser cutting program from the laser cutting program memory 53 according to the determined parameters, and then stores it in the processing program memory 43.

Further, the control device 35 includes an axial motion controller 59. The axial motion controller 59 controls axial motions of the laser processing head 29 in the X, Y and Z-axis directions according to the processing program stored in the processing program memory 43.

For example, in a case of cutting out the processed part 1 from the workpiece W as shown in FIG. 1, the processing program is analyzed by the program analyzer 45 when the processing program generated by the automatic programming apparatus 41 has been stored in the processing program memory 43. Then, the material and the thickness of the workpiece W and the shape and the dimensions of the processed part 1 are stored in an analyzed data memory 45A as analyzed data.

When the processing program has been analyzed, the weight arithmetic section 47A calculates a weight of the processed part 1 based on the analyzed data (the material and the thickness of the workpiece W and the shape and the dimensions of the processed part 1). In addition, the appropriate shape and the appropriate dimensions of the pressing protrusion 15 are selected from the workpiece parameter memory 51 based on the analyzed data.

When the appropriate shape and the appropriate dimensions of the pressing protrusion 15 have been selected from the workpiece parameter memory 51, an appropriate laser cutting condition for the laser cutting process of the pressing protrusion 15 is selected from the cutting condition parameter memory 57. Then, the processing program generator 55 generates the laser cutting program of the pressing protrusion 15 based on the selected laser cutting condition and the shape and the dimensions of the pressing protrusion 15, and stores it in the processing program memory 43. In addition, the press-force arithmetic section 47B calculates the pressing force of the pressing protrusion 15 based on the selected laser cutting condition and the width H and the length L of the pressing protrusion 15.

Based on the calculation result of the weight arithmetic section 47A and the calculation result of the press-force arithmetic section 47B, the number arithmetic section 47C calculates the required number of the pressing protrusions 15 for pressing and retaining the processed part 1 so as to restrict the processed part 1 from dropping off from the workpiece W. Note that, without using the press-force arithmetic section 47B, the required number of canonically-shaped pressing protrusions with respect to a weight of a retention object may be preliminarily determined and then the required number of the pressing protrusions 15 may be calculated based on the weight of the retention object.

When the number of the pressing protrusions 15 has been calculated by the number arithmetic section 47C, the pressing protrusions 15 are arranged around the processed part 1 by the pressing protrusion arranger 49. Note that the number arithmetic section 47C calculates the required minimum number. Therefore, for example, the pressing protrusion(s) 15 can be additionally arranged around the processed part 1 displayed on the display screen 39A of the display device 39 by the input device such as a mouse.

When the arrangement positions of the pressing protrusions 15 have been set, the cut slits 11 are laser-cut according to the arrangement positions of the pressing protrusions 15. Then, after the laser cutting of the cut slits 11, the outline 5 of the processed part 1 is laser-cut according to the processing program stored in the processing program memory 43. When the outline 5 has been laser-cut in this manner, the processed part 1 is pressed and retained by the plural pressing protrusions 15 arranged around the processed part 1 as explained above so as not to drop off from the workpiece W.

In the above explanations, the processing program generated by the automatic programming apparatus 41 is stored in the processing program memory 43 of the control device 35, and the program analyzer 45 of the control device 35 analyzes this stored processing program. However, there may be another way in which the automatic programming apparatus 41 analyzes a laser cutting program generated by itself, and then a program transferrer 63 (see FIG. 13) of the automatic programming apparatus 41 transfers this analyzed laser cutting program to the control device 35.

The automatic programming apparatus 41 in this case will be explained. Note that components identical or equivalent to the already-explained components of the control device 35 of the laser cutting machine 21 are labelled with the identical reference signs and their redundant explanations are omitted.

Figure 13:
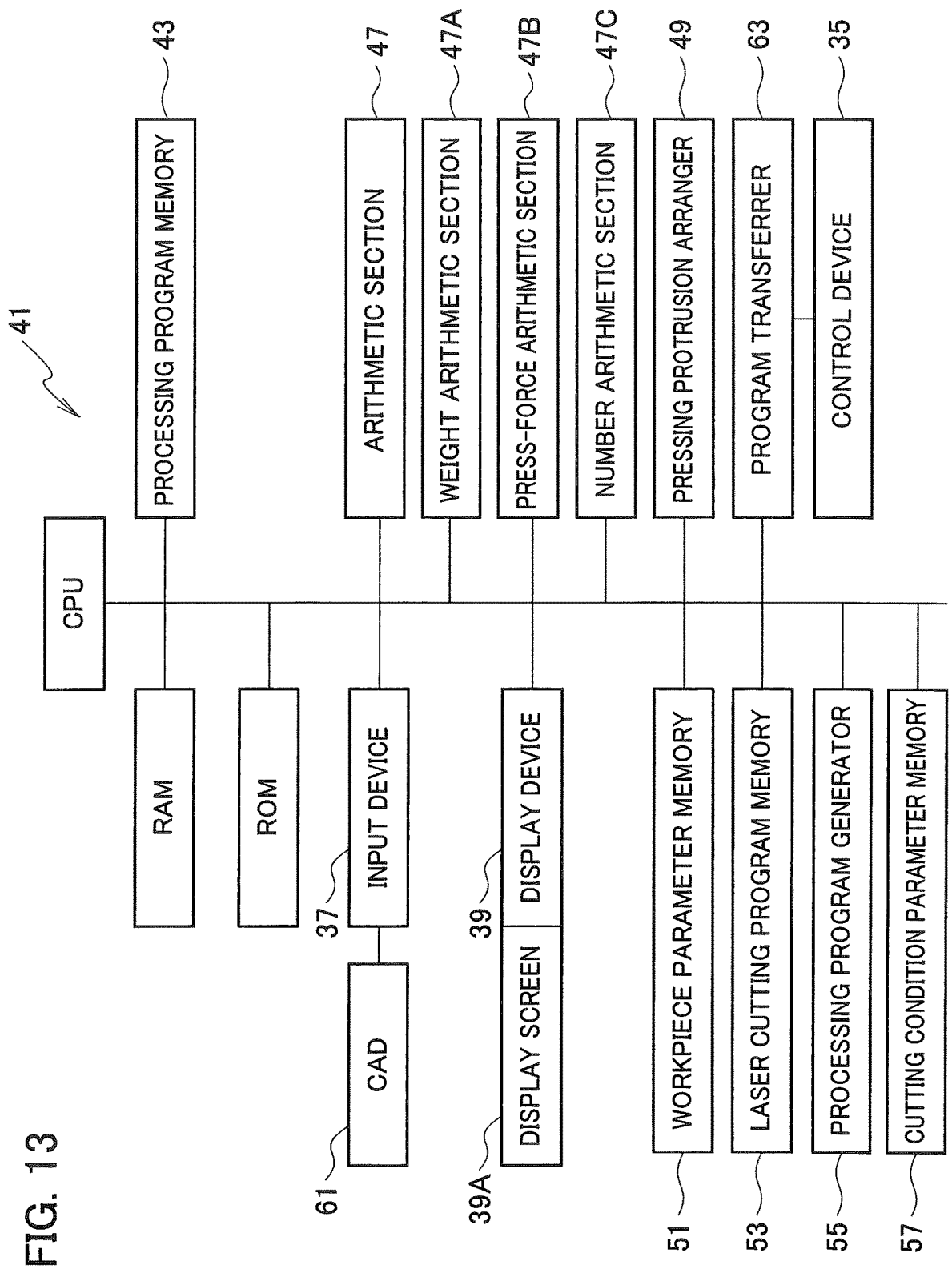
FIG. 13 It is a block diagrams of an automatic programing apparatus.

As shown in FIG. 13, the automatic programming apparatus 41 includes an arithmetic section 47 equivalent to the arithmetic section 47 of the control device 35. Therefore, when an operator inputs a shape and dimensions of the processed part through a CAD 61, the automatic programming apparatus 41 calculates a weight of the processed part 1, and a pressing force and the number of the pressing protrusions 15 to be arranged around the processed part 1 (a weight arithmetic section 47A, a press-force arithmetic section 47B and a number arithmetic section 47C). Then, the automatic programming apparatus 41 calculates the number of the pressing protrusions 15, and a pressing protrusion arranger 49 arranges the pressing protrusions 15 around the processed part 1.

When the arrangement positions of the pressing protrusions 15 have been set around the processed part 1, a processing program generator 55 generates a laser cutting program for carrying out a laser cutting processing of the pressing protrusions 15 and the processed part 1. The processing program generator 55 stores a laser cutting program generated by itself in a processing program memory 43. The program transferrer 63 transfers the laser cutting program stored in the processing program memory 43 to the control device 35.

Therefore, the control device 35 laser-cuts the workpiece W by controlling operations of the laser processing head 29 according to the laser cutting program generated by the automatic programming apparatus 41.

Note that, in the above embodiments, the length L of the pressing protrusion 15 is made three to eight times larger than the thickness of the workpiece W. If it is smaller than three times large value, the inward curvature of the pressing protrusion 15 decreases and thereby an sufficient pressing force cannot be got. On the other hand, if it exceeds over eight times large value, a curvature of the pressing protrusion 15 other than inward is subject to be generated. For example, the pressing protrusion 15 becomes subject to be twisted due to the weight of the processed part, and thereby the inward pressing force cannot be got effectively.

In addition, the measurements of the retention force are done by using the workpieces W whose thickness is 2.0 mm and 2.3 mm in the above embodiments, but it is still preferable, even if its thickness is larger, that the width H of the pressing protrusion 15 is made smaller than the thickness of the workpiece W and the length L of the pressing protrusion 15 is made three to eight times larger than the thickness of the workpiece W.

According to the above embodiments, the control device 35 or the automatic programming apparatus 41 arranges one or plural pressing protrusions 15 around the processed part 1 to be cut out from the sheet-shaped workpiece W. The curving pressing protrusion(s) 15 retains the processed part 1 so as not to drop it off from the workpiece W.

The entire contents of a Japanese Patent Application No. 2017-55555 (filed on Mar. 22, 2017) are incorporated herein by reference. Although the invention has been described above by reference to a certain embodiment of the invention, the invention is not limited to the embodiment described above. Scope of the present invention is determined in the context of the claims.

The invention claimed is:

1. A laser cutting method for cutting out a processed part from a sheet-shaped workpiece, the method comprising:
preliminarily laser-cutting a cut slit around the processed part that is to be cut out from the workpiece; and
carrying out a secondary laser cutting process along an outline of the processed part to cut out the processed part, the secondary laser cutting process being carried out such that a pressing protrusion is formed lengthwise along the outline of the processed part and between the cut slit and the outline of the processed part, the pressing protrusion being unjoined from the processed part by the secondary laser cutting process,
wherein the secondary laser cutting process along the outline of the processed part results in the pressing protrusion being curved and a free end of the pressing protrusion pressing a peripheral surface of the processed part so as to hold the processed part on the workpiece.

2. The laser cutting method according to claim 1, further comprising,
in a case of forming a hole inside the processed part, preliminarily laser-cutting the cut slit of the pressing protrusion around a scrap within the hole, the pressing protrusion being curved due to a laser cutting process along an outline of the hole and then pressing an inner peripheral surface of the hole.

3. The laser cutting method according to claim 2, wherein the processed part is laser-cut after laser-cutting the scrap within the hole.

4. The laser cutting method according to claim 1, wherein the pressing protrusion has a rectangular shape.

5. The laser cutting method according to claim 4, wherein the workpiece is a roll-expanded sheet metal, and
the pressing protrusion extends lengthwise in a roll-expanding direction of the workpiece.

6. The laser cutting method according to claim 4, wherein a base-end hole is laser-processed at a base end of the pressing protrusion, and then the cut slit is laser-cut from the base-end hole.

7. The laser cutting method according to claim 6, wherein a curvature support point of the pressing protrusion is made closer to the outline than the cut slit by making a diameter of the base-end hole larger than a width of the cut slit.

8. The laser cutting method according to claim 4, wherein a width of the pressing protrusion is not more than a thickness of the workpiece.

9. The laser cutting method according to claim 4, wherein a length of the pressing protrusion is three to eight times larger than a thickness of the workpiece.

10. A laser cutting machine for cutting out a processed part from a sheet-shaped workpiece, the machine comprising:
a laser processing head movable relative to the workpiece in X, Y and Z-axis directions; and
a control device for controlling motions of the laser processing head,
wherein the control device comprises:
a processing program memory that stores a processing program for laser-cutting the processed part;
a program analyzer that analyzes a shape and dimensions of the processed part by analyzing the processing program;
a weight arithmetic section that calculates a weight of the processed part based on the analyzed shape and the analyzed dimensions of the processed part and a thickness of the workpiece;
a number arithmetic section that calculates the number of pressing protrusions based on a calculation result of the weight arithmetic section, each of the pressing protrusions being curved due to a laser cutting process along an outline of the processed part and then pressing a peripheral surface of the processed part;
a pressing protrusion arranger that arranges the pressing protrusions around the processed part based on a calculation result of the number arithmetic section;

a processing program generator that generates a laser cutting program for forming the pressing protrusions at positions arranged by the pressing protrusion arranger;

the processing program memory that stores the laser cutting program generated by the processing program generator; and an axial motion controller that controls axial motions of the laser processing head according to the laser cutting program stored in the processing program memory.

11. The laser cutting machine according to claim 10, wherein the control device comprises a cutting condition parameter memory that stores various laser processing conditions as parameters.

12. The laser cutting machine according to claim 10, wherein the control device comprises a workpiece parameter memory that stores parameters of a width and a length of the pressing protrusions in association with a material and the thickness of the workpiece.

13. An automatic programming apparatus of a laser cutting machine, the apparatus comprising:

a weight arithmetic section that calculates a weight of a processed part based on a shape and dimensions of the processed part that are input though a CAD and a thickness of a workpiece;

a number arithmetic section that calculates the number of pressing protrusions based on a calculation result of the weight arithmetic section, each of the pressing protrusions being curved due to a laser cutting process along an outline of the processed part and then pressing a peripheral surface of the processed part;

a pressing protrusion arranger that arranges the pressing protrusions around the processed part based on a calculation result of the number arithmetic section;

a processing program generator that generates a laser cutting program for forming the pressing protrusions at positions arranged by the pressing protrusion arranger and laser-cutting the processed part;

a processing program memory that stores the laser cutting program generated by the processing program generator; and a program transferrer that transfers the laser cutting program stored in the processing program memory to a control device of the laser cutting machine.

14. The automatic programming apparatus according to claim 13, further comprising:

a cutting condition parameter memory that stores various laser processing conditions as parameters.

15. The automatic programming apparatus according to claim 13, further comprising:

a workpiece parameter memory that stores parameters of a width and a length of the pressing protrusions in association with a material and the thickness of the workpiece.

* * * * *